United States Patent [19]

Richter et al.

[11] 3,735,236

[45] May 22, 1973

[54] TV HORIZONTAL OSCILLATOR HAVING A STABILIZED AUXILIARY DC OUTPUT

[75] Inventors: Heinz Richter; Werner Thiele, both of Kronach, Germany

[73] Assignee: Loewe-Opta GmbH, Berlin, Germany

[22] Filed: Jan. 14, 1972

[21] Appl. No.: 217,767

[30] Foreign Application Priority Data

Jan. 16, 1971 Germany....................P 21 03 501.8

[52] U.S. Cl..........................................321/2, 315/27

[51] Int. Cl................................................H02m 3/22

[58] Field of Search ...................315/27; 321/2, 2 HF

[56] References Cited

UNITED STATES PATENTS

| | | | |
|---|---|---|---|
| 2,697,798 | 12/1954 | Schlesinger | 315/25 R |
| 3,417,282 | 12/1968 | Hall | 315/27 R X |
| 2,700,747 | 1/1955 | Finkelstein | 321/2 |
| 3,051,888 | 8/1962 | Kroner | 321/2 |
| 3,153,174 | 10/1964 | Claypool et al. | 315/27 R |
| 3,427,496 | 2/1969 | Wood | 315/27 R |
| 3,450,936 | 6/1969 | Knight | 315/27 R |
| 3,467,882 | 9/1969 | Young | 315/27 R |

OTHER PUBLICATIONS

IBM Technical Disclosure Bulletin, "DC–To–DC Converter" Vol. 10, No. 10, March, 1968, pp. 1613–1614.

*Primary Examiner*—William M. Shoop, Jr.
*Attorney*—Arthur O. Klein

[57] ABSTRACT

A TV horizontal oscillator having an output transformer is arranged to supply a principal AC output to the horizontal deflection yoke of a picture tube. In order to provide stabilized DC voltage to other transistor stages in the TV receiver, an auxiliary winding of the transformer is connected in series with the parallel combination of a resistance and a capacitance. A voltage proportional to the difference between the voltage across at least a portion of the auxiliary winding and that across the resistance-capacitance combination is rectified and filtered. The resulting DC output is substantially insulated from changes in current through the output transformer caused, e.g., by beam-current induced changes in the width of the TV picture.

4 Claims, 4 Drawing Figures

TV HORIZONTAL OSCILLATOR HAVING A STABILIZED AUXILIARY DC OUTPUT

BACKGROUND OF THE INVENTION

The DC voltage supply for the picture tube and many of the transistorized stages of a TV receiver may be advantageously generated by suitably rectifying and filtering portions of the transformer output of the associated horizontal oscillator. Because of the extremely high frequency of the oscillator, such rectification and filtering may be done with much smaller and simpler components and configurations than have previously been necessary when such DC voltage was derived from the line frequency power transformer.

The horizontal oscillator AC output is conventionally coupled to the horizontal deflection yoke of the picture tube. In an attempt to minimize unwanted changes in width of the TV picture (caused, e.g. by changes in the picture tube beam current), a first resistance may be inserted in series with a primary winding of the transformer and the transconductive path of the horizontal oscillator. Consequently, any tendency of the picture to widen, and thus induce changes in current in the oscillator output, will be offset by a decrease in the oscillator current because of such first resistance. Such decrease, in turn, will decrease the deflection caused by the horizontal deflection yoke to narrow the picture to its normal width.

Unfortunately, such automatic variation of the current through the oscillator output transformer to compensate for beam width changes generates corresponding (and undesirable) changes in the DC voltage derived at the output of the oscillator.

SUMMARY OF THE INVENTION

In accordance with the invention, the DC voltage derived from the output of the horizontal oscillator may be stabilized notwithstanding variations in the oscillator supply current caused, e.g., by beam current variations. An auxiliary winding on the oscillator output transformer is serially connected with the parallel combination of a second resistance and a capacitance, whereby changes in voltage developed across such auxiliary winding due to current changes through the oscillator tend to be offset by voltage changes across the second resistance. The required stabilized DC voltage is derived by suitably rectifying and filtering a voltage proportional to the net difference of the voltages across the auxiliary winding and the second resistance.

In a first embodiment of the invention, the auxiliary winding constitutes a tapped second primary winding in the transconductive path of the oscillator. In this case, the above-described rectifying and filtering means are serially connected between the tap of the second primary winding and the terminal of the second resistance most remote from the second primary winding.

In an alternative embodiment, the auxiliary winding is a secondary winding of the transformer having a terminal coupled to the transconductive path of the oscillator. The rectifying and filtering means are connected across the serial combination of the last-mentioned secondary winding and the second resistance.

In another alternative embodiment, the auxiliary winding is a second primary winding serially connected with the transconductive path of the oscillator. Suitable circuitry is provided to derive the stabilized DC output as the algebraic sum of (a) the rectified and filtered output of the second primary winding and (b) a voltage proportional to the voltage across the second resistance.

BRIEF DESCRIPTION OF THE DRAWING

The invention will be further set forth in the following detailed description taken in conjunction with the appended drawing, in which.

DETAILED DESCRIPTION

Figure 1:
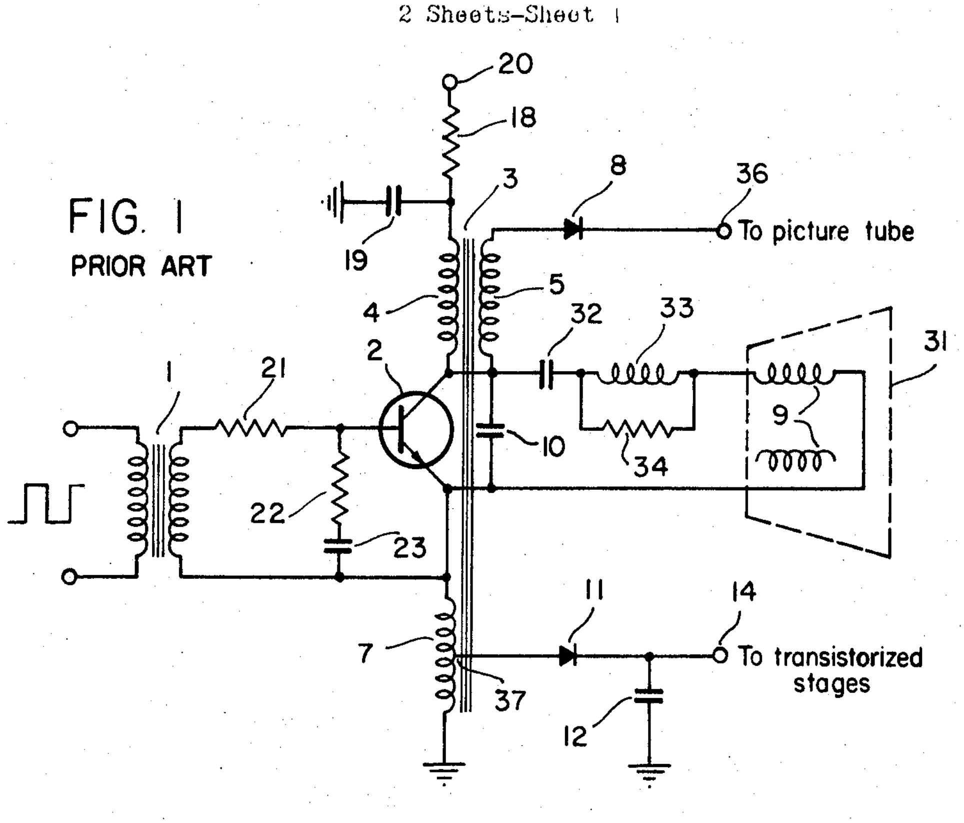
FIG. 1 PRIOR ART
FIG. 1 is a schematic diagram of a conventional TV horizontal oscillator having facilities for deriving a DC reference voltage from the transformer-coupled output of the oscillator.

Referring now in more detail to the drawing, FIG. 1 illustrates a prior art TV horizontal oscillator whose active element is a transistor 2. The base-emitter path of the transistor 2 is excited by a rectangular waveform via an input transformer 1, resistors 21 and 22, and a capacitor 23. The transconductive path of the transistor 2 is coupled to horizontal deflection yoke 9 of a suitable TV picture tube (represented schematically by dotted box 31) through a capacitor 32 and a coil 33 which is shunted by a resistor 34.

Such transconductive path is energized from a suitable source (not shown) at terminal 20 through a resistor 18, a first primary winding 4 of a transformer 3, and a grounded auxiliary primary winding 7 of the transformer 3. The junction of the resistor 18 and the winding 4 is returned to ground through a capacitor 19.

The transconductive path of the transistor 2 is also shunted by a capacitor 10 whose capacitance, together with the capacitance of the capacitor 32 and the effective inductance of the transformer 3, the coil 33 and the yoke 9 establishes the required repetitive sawtooth wave form necessary for the horizontal sweep portion of the TV raster.

In addition to supplying the deflection yoke 9, the oscillator is also adapted to supply DC voltages to the picture tube 31 and to other transistorized stages of the associated TV receiver (not shown). The DC voltage for the picture tube, for example, may be derived from a first secondary winding 5 of the transformer 3, whose output is coupled through a suitable rectifier 8 to a terminal 36 associated with the picture tube. The DC voltage for the other transistorized stages may be derived via a tap 37 of the auxiliary winding 7, whose output is coupled through a rectifier 11 to a terminal 14 associated with such other stages. A capacitor 12 is coupled from terminal 14 to ground as shown.

In the arrangement shown in FIG. 1, a primary purpose of the resistor 18 is to stabilize the width of the TV picture, which tends to change as the beam current of the picture tube 31 changes. Such beam current changes are manifested by corresponding changes in current through the transconductive path of the transistor 2, the resistor 18, and the windings 4 and 7 of the transformer 3. With the resistor 18 present, any tendency for the picture to widen because of changes in the beam current will decrease the output voltage of the oscillator and therefore the total deflection of the yoke 9, which in turn will tend to reduce the picture again to its normal width.

Unfortunately, the changes in current through the transconductive path of the oscillator because of the corrective action of the resistor 18 are also effective to change the current through the winding 7 of the transformer 3 and thus the derived DC voltage at the terminal 14. (A similar effect will, of course, appear at the terminal 36, but for simplicity of treatment, only the DC voltage at the terminal 14 will be considered in the following discussion).

Figure 2:
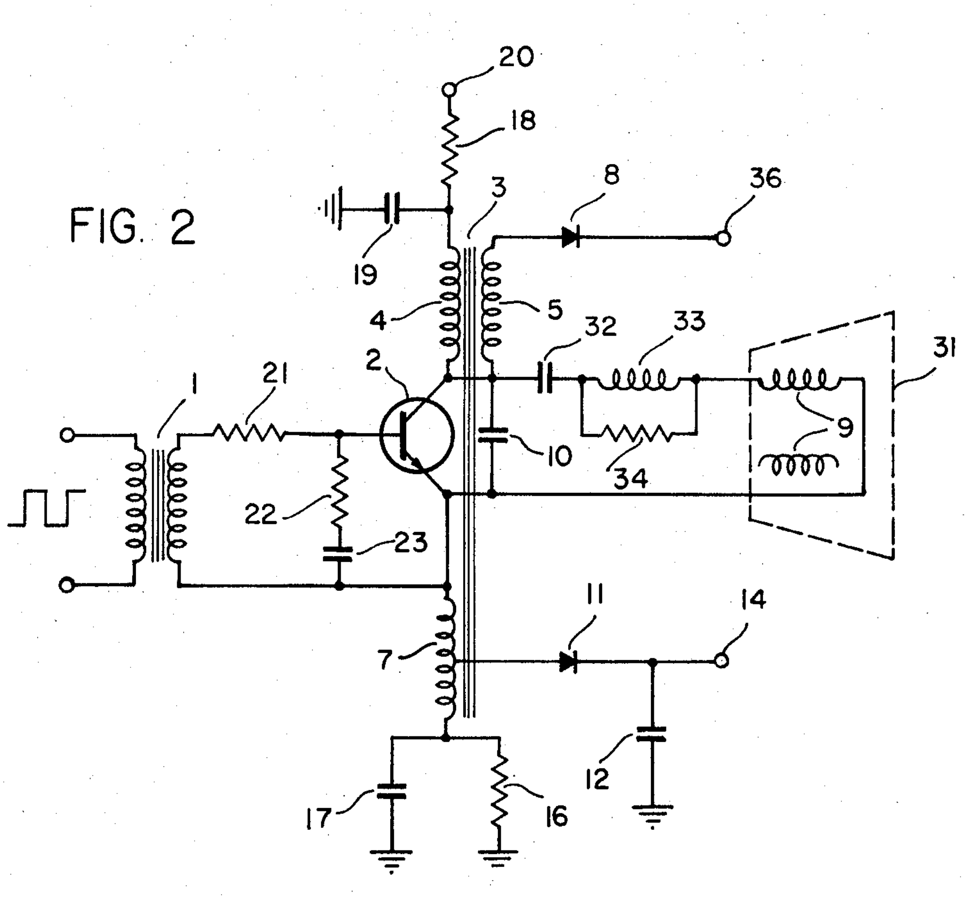
FIG. 2 is a schematic diagram of a modification of FIG. 1 in accordance with the invention for stabilizing the DC reference voltage against changes in current through the oscillator output transformer.

In accordance with a first form of the invention, the DC voltage at the terminal 14 may be stabilized against such beam-current induced changes in current through the transconductive path of the oscillator by the modification shown in FIG. 2. Corresponding elements in FIGS. 1 and 2 have been given corresponding reference numerals. In the arrangement of FIG. 2 the auxiliary winding 7, instead of being directly grounded, is grounded through the parallel combination of a resistor 16 and a capacitor 17; thus, the DC voltage developed at the auxiliary terminal 14 is derived, in effect, from the algebraic sum of the voltages across the lower portion of the winding 7 and across the resistor 16. Changes in these latter voltages tend to compensate each other during changes in the oscillator current caused, e.g. by beam width correction, so that the AC voltage at the input of the rectifier 11 (and thus the derived DC voltage at the terminal 14) tend to be constant.

Figure 3:
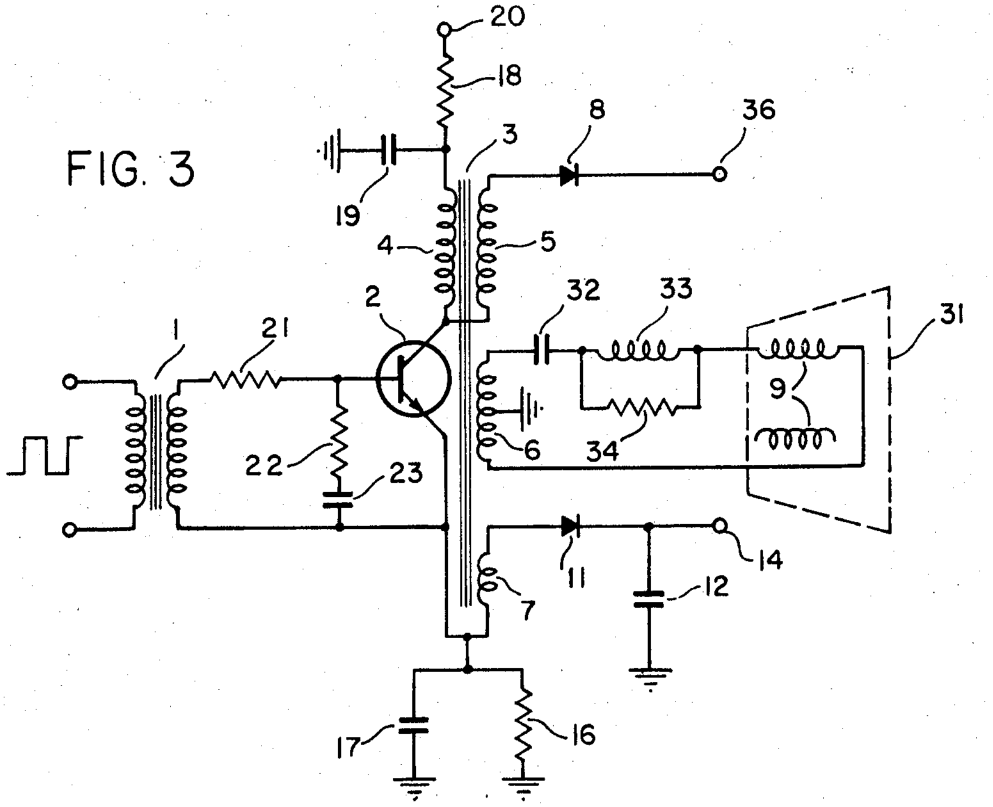
FIG. 3 is a schematic diagram of a first alternate form of the arrangement of FIG. 2.

A second form of the invention is shown in FIG. 3. In this case, the oscillator output voltage is coupled to the deflection yoke 9 via a center-tapped secondary winding 6 of the transformer 3; the center tap is grounded. Also, the auxiliary winding 7 is now a secondary, rather than a primary, winding of the transformer 3. The winding 7 is grounded through the parallel combination of the resistor 16 and the capacitor 17. The resistor 11 and the capacitor 12 (whose junction is the terminal 14) are serially coupled between the upper terminal of the winding 7 and the ground. The junction of the winding 7 and the resistor 16 is connected to a point in the transconductive path of the transistor 2, e.g., its emitter.

As in the arrangement of FIG. 2, changes in the voltages across the winding 7 and the resistor 16 in FIG. 3 caused by beam-current induced changes in the oscillator current tend to cancel each other so that the DC voltage at terminal 14 remains sensibly constant.

Figure 4:
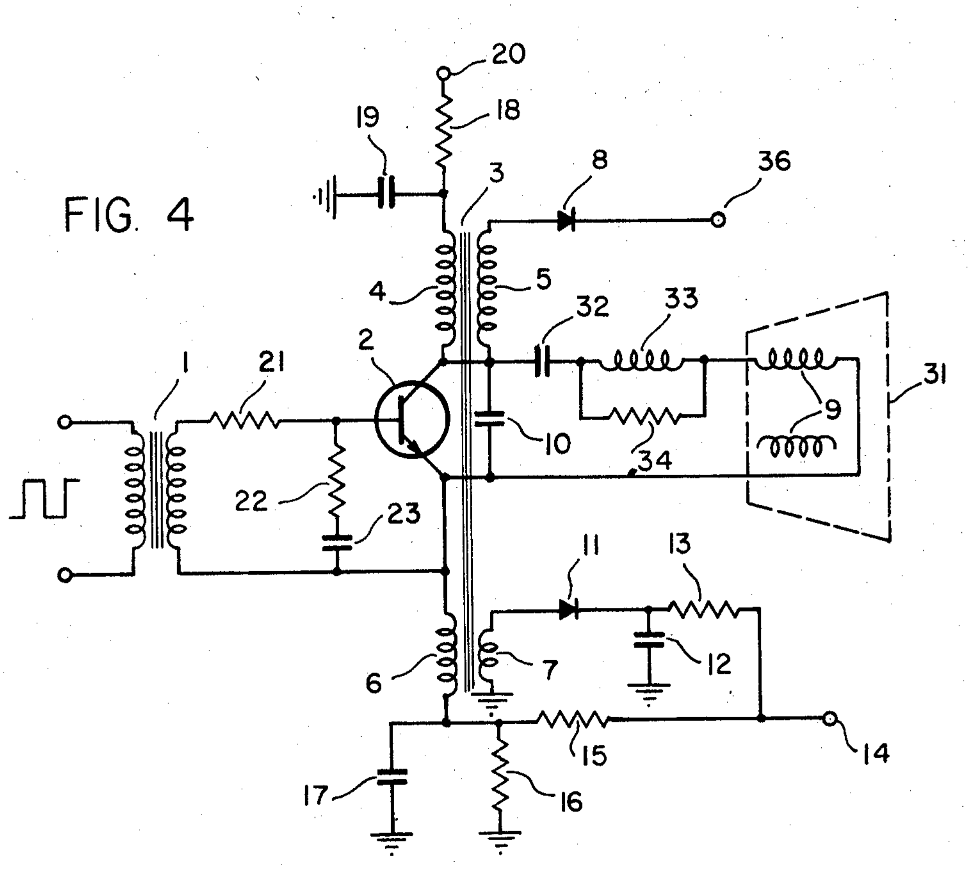
FIG. 4 is a schematic diagram of a second alternate form of the arrangement of FIG. 2.

In the third form of the invention shown in FIG. 4, the transconductive path of the transistor 2 is serially connected between supply terminal 20 and ground through primary winding 4, an auxiliary primary winding (designated 6 in FIG. 4), and the parallel combination of the resistor 16 and the winding 17. The transconductive path of the transistor 2 is coupled to the yoke 9 through the capacitor 32 and the resistor-shunted coil 33. The DC voltage at the terminal 14 is derived separately from two components which are added at the terminal 14. The first component is the voltage at the output of the grounded winding 7 (which in the arrangement of FIG. 4 is a secondary winding of the transformer 3), rectified and filtered by the network consisting of diode 11, capacitor 12 and resistor 13. The second component is the output voltage across the resistor 16, which is applied to the terminal 14 via a resistor 15. Changes in voltage across the winding 6 and across the resistor 16 in the transconductive path of the oscillator tend to balance each other, as before; and in the arrangement of FIG. 4, the resistors 13 and 15 may be selected to make the balance as complete as possible.

In the foregoing, the invention has been described in connection with preferred arrangements thereof. Many variations and modifications will now occur to those skilled in the art. Accordingly, it is desired that the scope of the appended claims not be limited to the specific disclosure herein contained.

What is claimed is:

1. In a TV horizontal oscillator, an arrangement for generating a reference DC voltage that is stabilized against current changes through the transconductive path of the oscillator, which comprises:

a transformer having at least a first primary winding serially connected in the transconductive path of the oscillator, and an auxiliary winding coupled to the transconductive path and responsive to such current changes for generating a first voltage that varies in proportion to such current changes;

a first resistance connected in series with the auxiliary winding and responsive to such current changes for generating a second voltage that varies in proportion to such current changes, whereby each incremental change in the second voltage is opposite to the corresponding incremental change in the first voltage;

a first capacitance connected in parallel with the first resistance; and means combining the voltages across the auxiliary winding and across the first resistance for deriving a DC voltage proportional to the algebraic sum of the combined voltages such DC voltages constituting the reference DC voltage.

2. An arrangement as defined in claim 1, in which the auxiliary winding is a tapped second primary winding of the transformer serially connected in the transconductive path, and in which the deriving means comprises, in combination, a rectifier and a second resistance serially connected between the tap of the second primary winding and the terminal of the first resistance most remote from the second primary winding, the voltage at the junction of the rectifier and the second capacitance constituting the reference DC voltage.

3. An arrangement as defined in claim 1, in which the auxiliary winding is a secondary winding of the transformer, in which the junction between the secondary winding and the first resistance is connected to a point in the transconductive path of the oscillator, and in which the deriving means comprises, in combination, a rectifier and a second capacitance connected across the serial combination of the secondary winding and the first resistance, the voltage at the junction of the rectifier and the second capacitance constituting the reference DC voltage.

4. In a TV horizontal oscillator, an arrangement for generating a reference DC voltage that is stabilized against current changes through the transconductive path of the oscillator, which comprises:

a transformer having first and second primary windings serially connected in the transconductive path of the oscillator, and a secondary winding;

a resistance connected in series with the second primary winding;

a capacitance connected in parallel with the resistance;

means for rectifying and filtering the output of the secondary winding; and means for adding the voltage across the resistance to the output of the rectifying and filtering means, the output of the adding means constituting the reference DC voltage.

* * * * *